US011993118B1

(12) United States Patent
Erdozain, Jr. et al.

(10) Patent No.: US 11,993,118 B1
(45) Date of Patent: *May 28, 2024

(54) MOTION CONTROL SYSTEM WITH ELECTROPERMANENT MAGNETS

(71) Applicant: APPLE INC., Cupertino, CA (US)

(72) Inventors: Jack Erdozain, Jr., Boston, MA (US); Jeffrey A. Sewell, Wyandotte, MI (US); Johnny L. Wall, Valencia, CA (US); Colin Szechy, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 947 days.

This patent is subject to a terminal disclaimer.

(21) Appl. No.: 16/941,587

(22) Filed: Jul. 29, 2020

Related U.S. Application Data

(63) Continuation of application No. 15/907,386, filed on Feb. 28, 2018, now Pat. No. 10,759,246.

(Continued)

(51) Int. Cl.
*B60G 17/00* (2006.01)
*B60G 17/005* (2006.01)
(Continued)

(52) U.S. Cl.
CPC ....... *B60G 17/0157* (2013.01); *B60G 17/005* (2013.01); *B60G 17/0165* (2013.01);
(Continued)

(58) Field of Classification Search
CPC .............. B60G 17/0157; B60G 17/005; B60G 17/0165; B60G 17/033; B60G 17/06;
(Continued)

(56) References Cited

U.S. PATENT DOCUMENTS

| 3,434,084 A | 3/1969 | Milligan |
| 3,791,309 A | 2/1974 | Baermann |

(Continued)

FOREIGN PATENT DOCUMENTS

WO  WO2016122337 A1 * 1/2016 ............. G01D 21/00

OTHER PUBLICATIONS

Ochoa Cardenas, F. "Design of novel adaptice magnetic adhesion mechanism for climbing robots in ferric structures" The University of Sheffield, 2016 (Year: 2016).*

(Continued)

*Primary Examiner* — Elaine Gort
*Assistant Examiner* — Brittany Renee Peko
(74) *Attorney, Agent, or Firm* — Young Basile Hanlon & MacFarlane, P.C.

(57) ABSTRACT

A motion control system that can detect a change in a an operating characteristic and send a stabilizing command to an actuator system based on the change is described. A motion control component in the system includes a first component with an electropermanent magnet having a coil, differing first and second permanent magnet materials, and differing first and second states. The motion control component includes a second component configured to magnetically interact with the first component to define a damping characteristic that affects motion between the first component and the second component and a controller configured to supply a current pulse to the electropermanent magnet to switch the electropermanent magnet between the first and second states. The electropermanent magnet retains the respective first or second state after cessation of the current pulse.

20 Claims, 8 Drawing Sheets

Related U.S. Application Data

(60) Provisional application No. 62/468,515, filed on Mar. 8, 2017.

(51) Int. Cl.

| | | |
|---|---|---|
| *B60G 17/015* | (2006.01) | |
| *B60G 17/0165* | (2006.01) | |
| *B60G 17/033* | (2006.01) | |
| *B60G 17/06* | (2006.01) | |
| *H01F 7/02* | (2006.01) | |
| *H01F 7/06* | (2006.01) | |

(52) U.S. Cl.
CPC ........... *B60G 17/033* (2013.01); *B60G 17/06* (2013.01); *H01F 7/0231* (2013.01); *H01F 7/064* (2013.01); *B60G 2202/16* (2013.01); *B60G 2202/25* (2013.01); *B60G 2202/42* (2013.01); *B60G 2204/46* (2013.01); *B60G 2204/62* (2013.01); *B60G 2400/05* (2013.01); *B60G 2400/206* (2013.01); *B60G 2400/208* (2013.01); *B60G 2600/182* (2013.01); *B60G 2600/22* (2013.01); *B60G 2800/01* (2013.01)

(58) Field of Classification Search
CPC ........... B60G 2202/16; B60G 2202/25; B60G 2202/42; B60G 2204/46; B60G 2204/62; B60G 2400/05; B60G 2400/206; B60G 2400/208; B60G 2600/182; B60G 2600/22; B60G 2800/01; H01F 7/0231; H01F 7/064
See application file for complete search history.

(56) References Cited

U.S. PATENT DOCUMENTS

| | | |
|---|---|---|
| 6,154,353 A | 11/2000 | Bowers et al. |
| 8,279,031 B2 | 10/2012 | Fullerton et al. |
| 8,570,129 B2 | 10/2013 | Fullerton |
| 2012/0188037 A1* | 7/2012 | Fullerton ................. H01F 7/00 335/296 |
| 2014/0285930 A1 | 9/2014 | Powell |
| 2015/0224845 A1* | 8/2015 | Anderson .......... B60G 17/0152 |
| 2016/0244076 A1 | 8/2016 | Tyde et al. |
| 2016/0344312 A1 | 11/2016 | Trangbaek et al. |
| 2017/0278613 A1* | 9/2017 | Powell .................... H01F 7/206 |
| 2018/0141543 A1* | 5/2018 | Krosschell ............ B60W 30/04 |

OTHER PUBLICATIONS

Gysen et al., "Active Electromagnetic Suspension System for Improved Vehicle Dynamics", IEEE Transactions on Vehicular Technology, vol. 59, No. 3, Mar. 2010, 8 pp.

Martins et al., "Permanent-Magnets Linear Actuators Applicability in Automobile Active Suspensions", IEEE Transactions on Vehicular Technology, vol. 55, No. 1, Jan. 2006, 9 pp.

Isa et al., "A Review on Electromagnetic Suspension Systems for Passenger Vehicle", International Conference on Electrical, Control and Computer Engineering, Pahang, Malaysia, Jun. 2011, 5 pp.

* cited by examiner

MOTION CONTROL SYSTEM WITH ELECTROPERMANENT MAGNETS

CROSS-REFERENCE TO RELATED APPLICATIONS

This application is a continuation of U.S. patent application Ser. No. 15/907,386, filed Feb. 28, 2018, which claims priority to U.S. Provisional Application No. 62/468,515, filed on Mar. 8, 2017, the contents of which are incorporated herein by reference.

TECHNICAL FIELD

The application relates generally to motion control systems and more particularly to motion control systems using electropermanent magnets.

BACKGROUND

Motion control systems are designed to provide stability, that is, the ability to maintain an intended course, while at the same time isolating a body from changes in a surface that impact ride feel and comfort. For a smooth ride, a motion control system with tunable springs and dampers allows adjustment to the characteristics of the surface. Traditional forms of a motion control system can provide a smooth rider on a variety of surfaces, but some topologies require a large, constant current draw to maintain height. A motion control system that performs well without requiring a large, constant current draw would expend less energy and maintain or improve ride feel and comfort for passengers over traditional motion control systems.

SUMMARY

One aspect of the disclosure is a method of stabilizing a vehicle. The method includes identifying, by a control system, a change in a vehicle operating characteristic; outputting, by the control system, a stabilizing command to an actuator system based on identifying the change in the vehicle operating characteristic; and applying, by the actuator system, a first magnetic field having a predetermined strength to an electropermanent magnet for a predetermined duration based on receiving the stabilizing command. The first magnetic field transitions the electropermanent magnet from a first state to a second state, the electropermanent magnet generates a second magnetic field in the second state, the second magnetic field modifies at least one of a spring constant or a mechanical resistance of a suspension component within a suspension system of the vehicle, and the electropermanent magnet retains the second state after the predetermined duration in absence of the first magnetic field.

Another aspect of the disclosure is a suspension component for an active suspension system. The suspension component includes a first component that includes an electropermanent magnet, the electropermanent magnet having a first state and a second state, and a second component, wherein magnetic interaction between the first component and the second component defines a damping characteristic that affects relative motion of the first component and the second component. A controller is operable to supply a current pulse to the electropermanent magnet to switch an active state of the electropermanent magnet between the first state and the second state, wherein the electropermanent magnet retains the active state after cessation of the current pulse.

Another aspect of the disclosure is a suspension component. The suspension component includes a first component that includes a first magnetic section that includes an electropermanent magnet and a second magnetic section that includes an electromagnet, and a second component that includes an alternating polarity permanent magnet having sections of that alternate in polarity along an axial length of the second component. Magnetic interaction of the alternating polarity permanent magnet with the first magnetic section and the second magnetic section affects relative motion of the first component and the second component. A controller is operable to supply a current pulse to the electropermanent magnet of the first magnetic section to switch an active state of the electropermanent magnet between a first state and a second state, wherein the electropermanent magnet retains the active state after cessation of the current pulse.

DETAILED DESCRIPTION

Improvements to active suspension systems that reduce energy usage by leveraging electropermanent (EP) magnets or other variable flux magnets are described herein.

Figure 1:
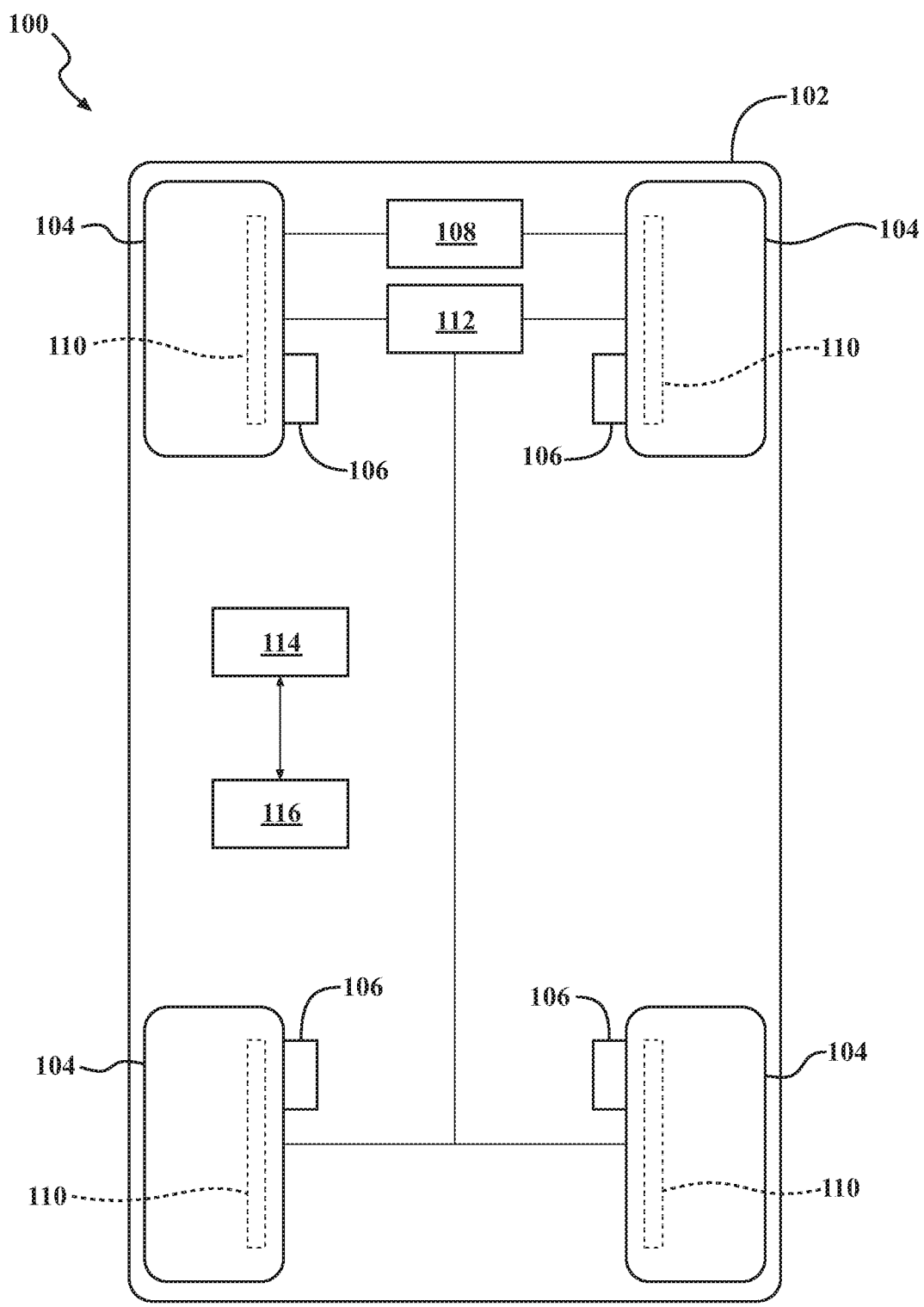
FIG. 1 is an illustration showing a vehicle.

FIG. 1 shows a vehicle 100 that has a vehicle body 102. The vehicle body 102 may include internal structural portions and external portions that are aesthetic and/or structural in nature. As examples, the vehicle body 102 may include one or more of a unibody, a frame, a subframe, a monocoque, and body panels.

The vehicle 100 includes road wheels 104. Four of the road wheels 104 are included in the illustrated example, but other implementations are possible. The road wheels 104 contact the surface on which the vehicle 100 is travelling, and the characteristics of the road wheels 104 are responsible, in part, for the amount of friction available. The road wheels 104 may include tires, such as conventional pneumatic tires formed in part from synthetic rubber, or may include other friction-enhancing structures.

The vehicle 100 includes suspension components 106. The suspension components 106 typically include numerous individual components, many of which are associated with one or more of the road wheels 104. The suspension components 106 may include components that are operable to control characteristics of the motion of the road wheels 104 relative to the vehicle body 102, such as shocks, struts, springs, dampers, and sway bars. The suspension components 106 may include either or both of non-adjustable passive components or adjustable active components that allow modification of suspension characteristics during operation of the vehicle 100. The suspension components 106 may include sensors that output signals indicative of the operating characteristics of some or all of the suspension components 106 at a given time. The suspension components 106 may also include actuators that are able to cause modification of operating characteristics of the suspension components 106 in response to control signals.

The vehicle 100 includes steering components 108. The steering components 108 are operable to modify a steering angle of some or all of the road wheels 104 relative to the vehicle body 102. As one example, the steering components 108 may be or include a conventional rack and pinion arrangement. In some examples, the steering components 108 are operable to control the steering angles of the road wheels 104 independently. The steering components 108 may include one or more sensors to output signals indicative of the steering angles of the road wheels 104. The steering components 108 may include actuators operable to cause adjustment of the steering angles of the road wheels 104 in response to control signals.

The vehicle 100 includes braking components 110. The braking components 110 include components that are operable to slow the speeds of the road wheels 104, such as conventional disk brakes. Other types of components may be utilized to slow the speeds of the road wheels. The braking components 110 also include components that cause and control application of braking forces. These components may include, as examples, a brake control module, a master cylinder, and a brake booster. The braking components 110 may be operable to apply braking to each of the road wheels 104 individually. The braking components 110 may include sensors that output signals that are indicative of the current operating characteristics of the braking components 110. The braking components 110 may also include actuators that are operable to cause and control application of braking forces in response to control signals.

The vehicle 100 includes propulsion components 112. The propulsion components 112 may be referred to as a powertrain. The propulsion components 112 include a prime mover that is operable to convert stored energy into driving force and components that are operable to supply this force to some or all of the road wheels 104 in order to propel the vehicle 100. As one example, the propulsion components 112 may include an internal combustion engine that burns liquid fuel. As another example, the propulsion components 112 may include an electric motor that utilizes electrical energy that is stored in batteries or supplied by a generator.

The vehicle 100 includes an electronic control unit 114. Although a single electronic control unit 114 is shown, the same functions may be implemented using multiple electronic control units, such as individual electronic control units associated with each of the various components of the vehicle 100. The electronic control unit 114 may be in electrical communication with components including the suspension components 106, the steering components 108, the braking components 110, and the propulsion components 112 to transmit commands to the components and/or to receive information from the components. The electronic control unit 114 may include a memory and a processor that is operable to execute instructions that are stored in the memory in order to perform operations as will be described herein.

The vehicle 100 includes sensors 116 that are in communication with the electronic control unit 114. The sensors 116 monitor and report information regarding operating characteristics of the vehicle 100. Some of the sensors 116 may be incorporated in the suspension components 106, the steering components 108, the braking components 110, and the propulsion components 112.

Figure 2:
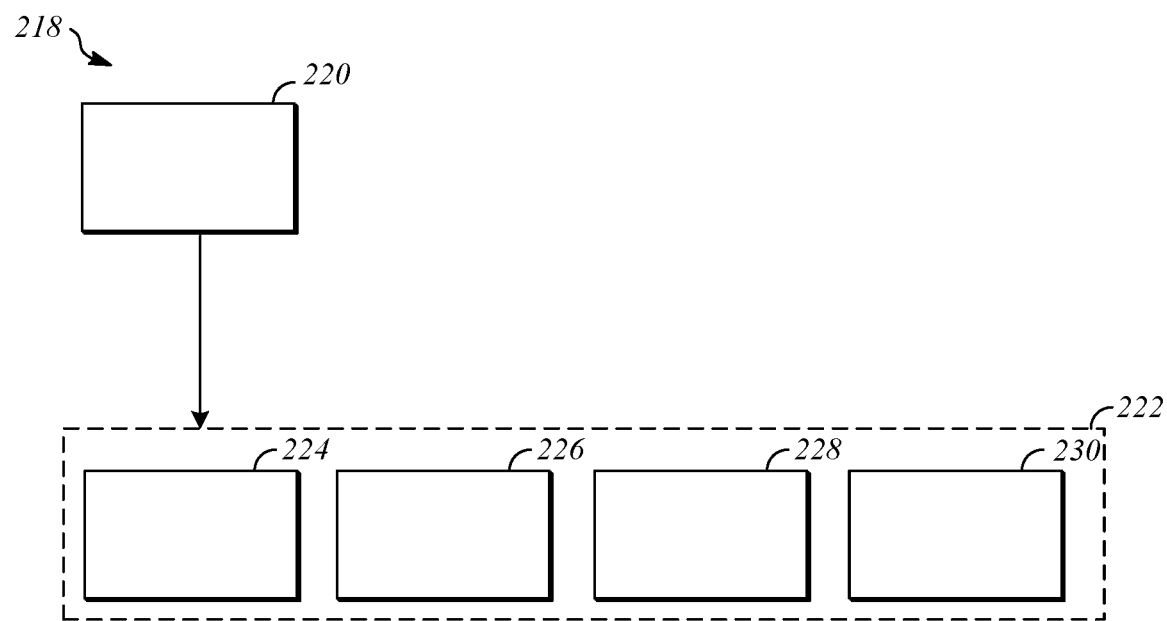
FIG. 2 is an illustration showing a vehicle control system.

FIG. 2 shows a control system 218 that may be implemented in the vehicle 100. The functions of the control system 218 may be implemented using a controller 220 that includes a memory and a processor that is operable to execute instructions that are stored in the memory, such as the electronic control unit 114 of FIG. 1. The controller 220 is responsible for implementing vehicle responses based, for example, on decision-making algorithms in an autonomous system and/or on driver inputs to the vehicle 100.

For example, the controller 220 can receive information from the sensors 116 and make decisions regarding operation of the vehicle 100. Information received from the sensors 116 may include information representing the roadway on which the vehicle 100 is travelling including objects and obstacles on the roadway. This information may identify terrain type of the environment, lane and roadway boundaries, or may be usable to allow identification of terrain type and roadway and lane boundaries. The information received from the sensors 116 may also include information regarding a current operating characteristic or condition of the vehicle 100. As an example, this information may include spring constants, mechanical resistance, and/or other damping characteristics for some of the suspension components 106. As another example, this information may include slip angle, friction, and wheel speeds for each of the road wheels 104 of the vehicle 100.

Decision making algorithms may include, for example, modifying operating characteristics of various components of the vehicle 100 based on the information received from the sensors 116. As an example, if a terrain change is detected ahead of the vehicle 100, the controller 220 may send commands to an actuator system 222 to change performance and/or properties of various actuated components to better provide comfort to the passengers within the vehicle 100 while the vehicle 100 traverses the changed terrain.

The actuator system 222 may incorporate systems that directly modify operating characteristics of the vehicle 100. The components of the actuator system 222 may be controlled by commands received from the controller 220. In the illustrated example, the actuator system 222 includes a suspension system 224, a steering system 226, a propulsion system 228, and a braking system 230, though other systems are possible.

The suspension system 224 is operable to exercise control over, coordinate operation of, and receive information from the suspension components 106. The steering system 226 is operable to exercise control over, coordinate operation of, and receive information from the steering components 108. The propulsion system 228 is operable to exercise control over, coordinate operation of, and receive information from the propulsion components 112. The braking system 230 is operable to exercise control over, coordinate operation of, and receive information from the braking components 110. The suspension system 224, the steering system 226, the propulsion system 228, and the braking system 230 may each respond to and execute commands received from the controller 220 and may each transmit information to the controller 220, such as information received from the sensors 116.

For example, the controller 220 may send commands to the actuator system 222 to change spring constants for at least some of the suspension components 106 within the suspension system 224 in a manner that changes a ride feel or stiffness of the vehicle 100. Changing spring constants or mechanical resistance (collectively referred to as "damping characteristics") can decrease movement of the vehicle 100 based on harmonic or oscillatory inputs to the vehicle 100 as captured by the sensors 116. Changing spring constants or mechanical resistance can also occur in response to driver inputs, for example, to change ride feel. In another example, the controller 220 may send commands to the actuator system 222 to improve lateral stability, yaw stability, and/or roll stability by modifying some of the steering components 108 within the steering system 226. In another example, the actuator system 222 may control some of the braking components 110 in the braking system 230 to apply the brakes.

Figure 3:
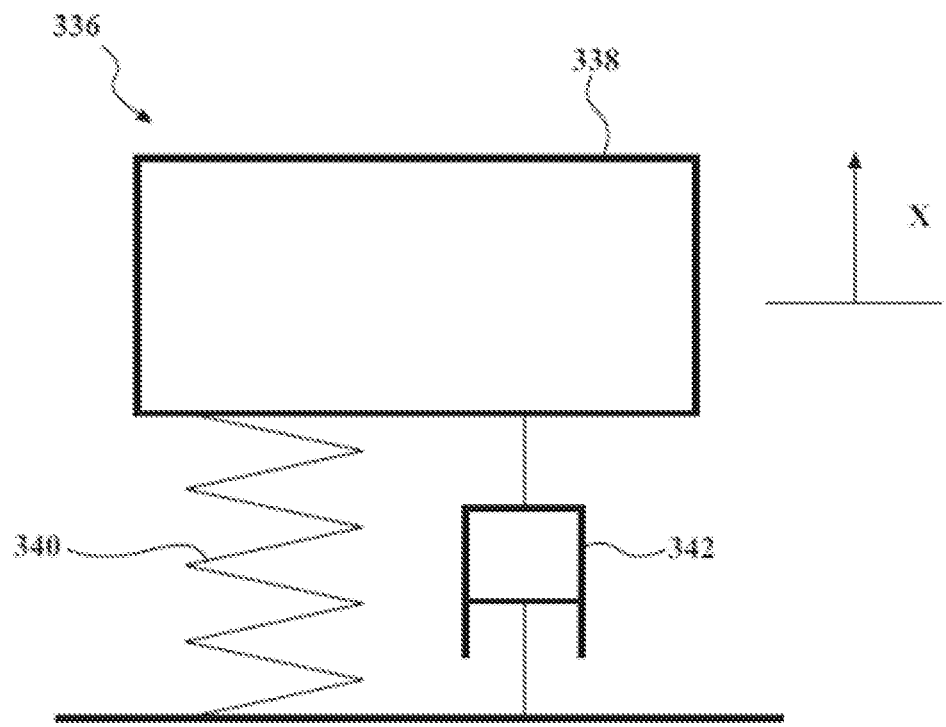
FIG. 3 is an ideal mass-spring-damper system.

FIG. 3 is an ideal mass-spring-damper system 336 used to describe harmonic motion. An idealized vehicle 338 can have a mass m. An idealized spring 340 can have a spring constant k. An idealized damper 342 can have a mechanical resistance c. The spring 340 and the damper 342 can represent one or more components within a suspension system of the vehicle 338 that minimize oscillatory input from a ground surface to the vehicle 338. Movement of the vehicle 338, the spring 340, and the damper 342 occurs in a single direction indicated by x in this ideal system 336.

Movement, or changes in x, are driven by forces acting upon the vehicle 338 under Newton's Law ($F_v$), Hooke's Law ($F_s$), and a general theory of mechanical resistance or damping ($F_d$) per the equation: $F_v + F_s + F_d = 0$. In this example, $$F_v = m \frac{d^2 x}{dt^2},$$

$F_s = kx$, and $$F_d = c \frac{dx}{dt}.$$

In other words, harmonic motion experienced by the vehicle 338 having the mass m will be based on the spring constant k of the spring 340 and the mechanical resistance c of the damper 342. Hence, changes to these values will change motion of the vehicle 338 in a manner that modifies ride feel.

Figure 4:
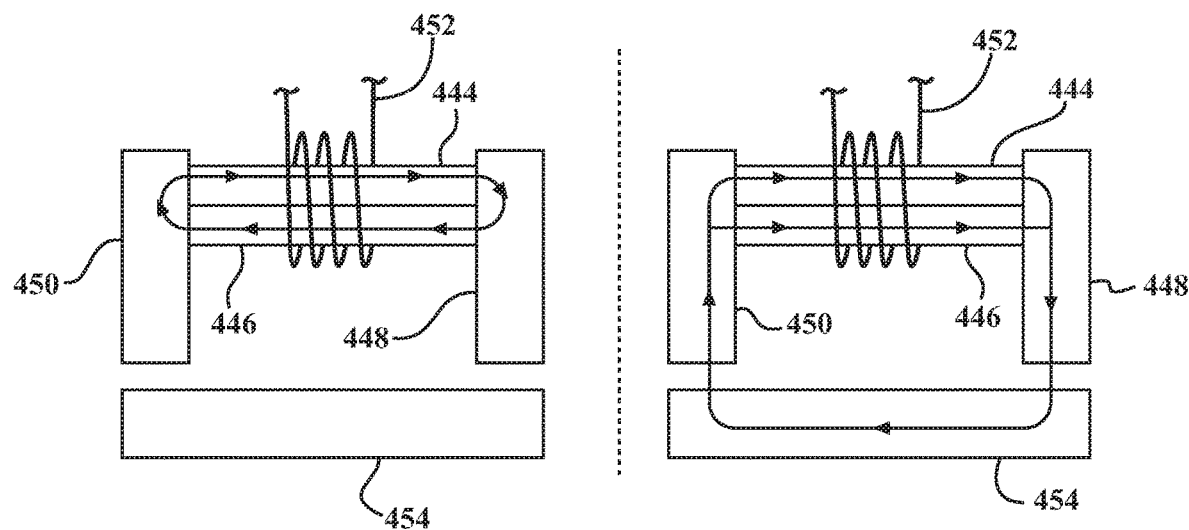
FIG. 4 is an illustration of an electropermanent magnet.

FIG. 4 is an illustration of an electropermanent (EP) magnet. The EP magnet can include a pair of rods 444, 446 formed of different permanent magnet materials that are capped with soft-metal poles 448, 450, wrapped with a coil 452, and situated proximate to a ferromagnetic object 454. One of the rods 444 can be formed of a hard magnetic material, such as a combination of Neodymium, Iron, Boron (e.g., $Nd_2Fe_{14}B$ or NdFeB), and the other of the rods 446 can be formed of a semi-hard magnetic material, such as Alnico V.

As shown on the left side of FIG. 4, sending a current pulse through the coil 452 in the negative direction switches the polarization of the rod 446 of semi-hard magnetic material so it is opposite of the polarization of the rod 444 of hard magnetic material. The polarization of the rod 444 of hard magnetic material is unchanged because it has a larger magnetic coercivity than the rod 446 of semi-hard magnetic material. With the rods 444, 446 having opposite polarization, magnetic flux circulates along the rods 444, 446 but does not leave the soft-metal poles 448, 450, and thus, does not exert force on the ferromagnetic object 454. This flux pattern continues after the current in the coil 452 is returned to zero. This is consistent with an "off" state of the EP magnet.

As shown on the right side of FIG. 4, sending a current pulse through the coil 452 in the positive direction switches the polarization of the rod 446 of semi-hard magnetic material so it is aligned with the polarization of the rod 444 of hard magnetic material. In this state, magnetic flux from both of the rods 444, 446 flows through the soft-metal poles 448, 450 and to the ferromagnetic object 454, attracting it. The attraction continues after the current in the coil 452 is set to zero. This is consistent with an "on" state of the EP magnet. No power is required to maintain the respective external magnetic fields in either the "off" state or the "on" state.

The current pulses that change the state of the EP magnet between the "off" state and the "on" state may be described as momentary current pulses. Although these current pulses are momentary (i.e., current is supplied for a finite duration), the effect of the current pulse on the state of the EP magnet is not dependent on its continued application, and the state changes between the "off" state and the "on" state remain indefinitely after cessation of the current pulse. Thus, supply of a current pulse to the EP magnet is operable to switch an active state of the EP magnet between a first state (e.g., the "off" state) and a second state (e.g., the "on" state), and the EP magnet retains the active state after cessation of the current pulse. The only power required is that to do mechanical work or to change between the states of the EP magnet as described further in respect to FIG. 5.

Figure 5:
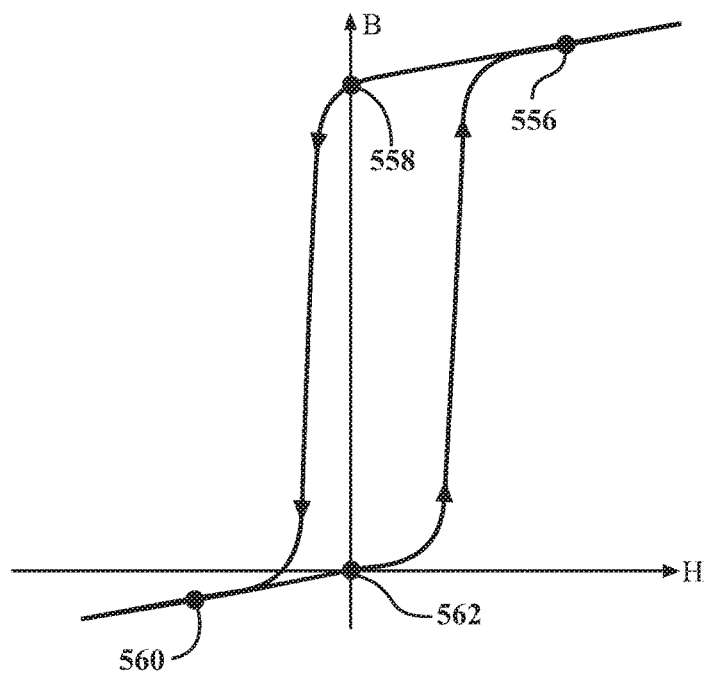
FIG. 5 is a plot of magnetic flux density v. magnetic field intensity for the electropermanent magnet of FIG. 4.

FIG. 5 is a plot of magnetic flux density (B) v. magnetic field intensity (H) for the EP magnet of FIG. 4. The plot shown is a combination of B/H plots for the semi-hard magnetic material Alnico V and the hard magnetic material NdFeB. As described in reference to FIG. 4, passing a current through the coil 452 imposes a magnetic field (H) across the rods 444, 446. The resulting magnetic flux density (B) passes through the air gap between the modules giving rise to an attractive force. While a positive current is flowing through the coil 452, it induces a positive magnetic field intensity (H) indicated by the point 556. When the positive current is removed, the magnetic field intensity (H) softens to zero as shown by the point 558, and only a positive magnetic flux density (B) remains. Again, this is the "on" state of the EP magnet.

When the system has the "on" state as shown by the point 558, passing a negative current through the coil 452 induces a negative magnetic field intensity (−H) as indicated by the point 560. When the negative current is removed, the magnetic field intensity (−H) softens to zero as shown by the point 562, and zero or no positive magnetic flux density (B) remains. Again, this is the "off" state of the EP magnet. The process can be repeated to move the EP magnet between the "off" state and the "on" state.

The energy required to switch between the "off" state and the "on" state for an EP magnet scales with volume. Though the instantaneous power draw to send positive or negative current through the coil 452 for the EP magnet is higher than for an equivalently sized electromagnet, the time to make the switch is very short. EP magnets can thus result in energy savings if switching occurs somewhat infrequently as would be the case when using an EP magnet as part of one of the suspension components 106 in the suspension system 224.

Note, though EP magnets are specifically discussed throughout this specification, any other type of variable flux magnet may be used as well. A variable flux magnet is a magnet that allows tuning of the relative strength of the magnetic flux density (B) being produced by the variable flux magnet.

Figure 6:
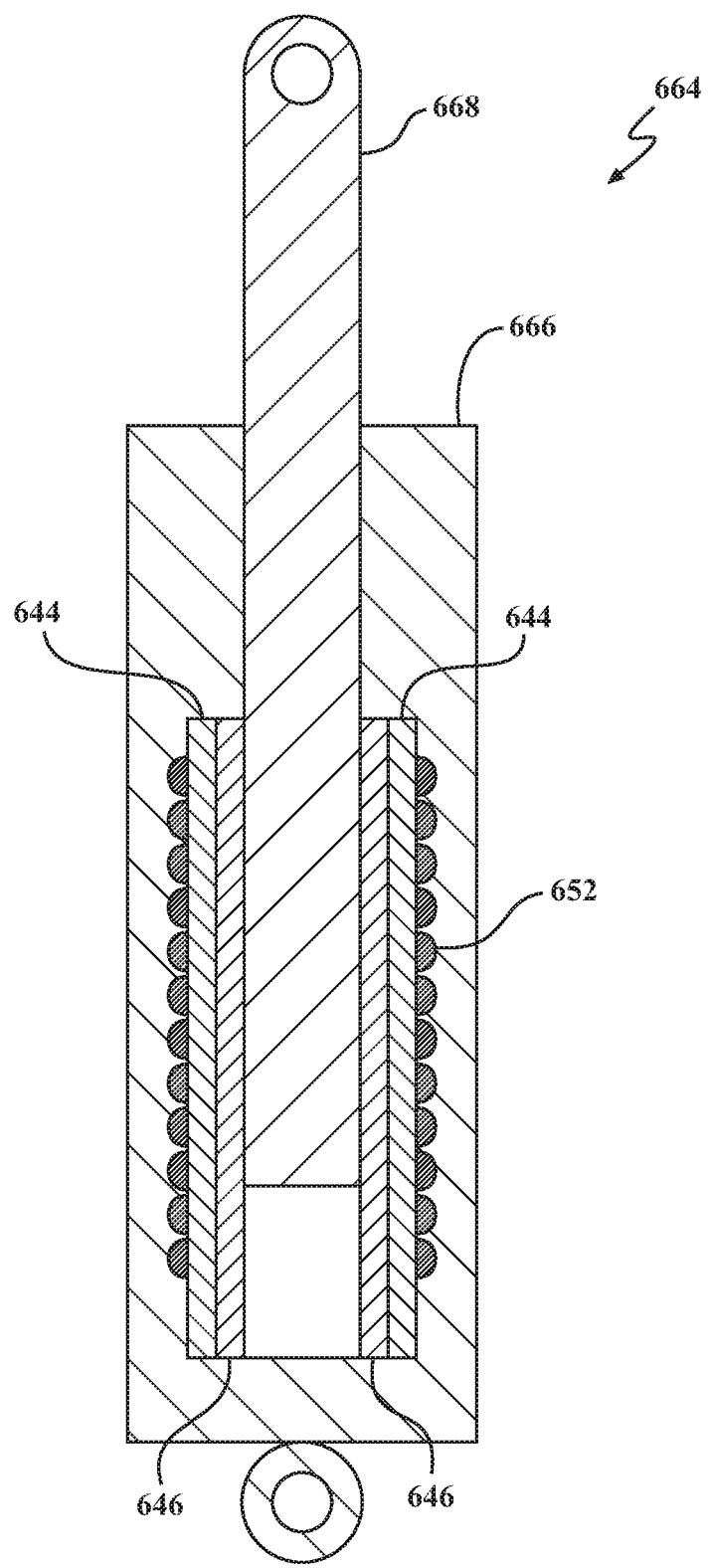
FIG. 6 is a cross-section of a damper for use in an active suspension system.

FIG. 6 is a cross-sectional view of a damper 664 for use in an active suspension system, such as the suspension system 224 described in respect to FIG. 2. The damper 664 includes a static component 666 and a moving component 668. The static component 666 includes an EP magnet formed of a pair of rods 644, 646 of different permanent magnet materials surrounded or wrapped by a coil 652. The rods 644, 646 and the coil 652 can be situated generally adjacent to the moving component 668. One of the rods 644 can be formed of a hard magnetic material, such as NdFeB, and the other of the rods 646 can be formed of a semi-hard magnetic material, such as Alnico V. The moving component 668 can be formed of a solid ferromagnetic material or include fluids saturated with magnetic materials.

A mechanical resistance of the damper 664 can be modified by changing a state of the EP magnet from a first state (e.g., an "off" state) to a second state (e.g., an "on" state). This change in state of the EP magnet can be driven, for example, by the controller 220 detecting a change in a vehicle operating characteristic. For example, the sensors 116 may provide information to the controller 220 that indicates the vehicle 100 is experiencing an increase or decrease in harmonic or oscillatory input from a driving surface consistent with a change in ride characteristics of the vehicle.

Upon detecting the change in the vehicle operating characteristic, the controller 220 can send a command to the actuator system 222 to pass a current through the coil 652 that will impose a first magnetic field across the rods 644, 646. The first magnetic field can have a predetermined magnetic field intensity or predetermined strength based, for example, on a magnitude of the change in the vehicle operating characteristic. The first magnetic field can be applied for a predetermined duration sufficient to transition the EP magnet from a first state (e.g., either an "on" state or an "off" state) to a second state (e.g., the other of the "on" state or the "off" state). In other words, the predetermined duration of the application of the first magnetic field can be based on the amount of energy required to transition the EP magnet from the first state to the second state. The predetermined strength of the magnetic field can dictate a magnitude of the modification of the mechanical resistance of the damper 664. On some terrains, more or less dampening will be desirable to provide an adequate ride feel for passenger comfort. The changes between states of the EP magnet can be implemented quickly such that an active suspension adequately responds to changes in ride surfaces.

In at least one example, the rods 644, 646 of the EP magnet do not have a residual magnetic flux density, that is, do not generate their own magnetic field when the EP magnet is in the first state. The rods 644, 646 of the EP magnet will have a residual flux density, that is, will generate a second magnetic field once the EP magnet transitions from the first state to the second state. Based on a magnitude of the second magnetic field, the static component 666 of the damper 664 will attract the moving component 668 based on the moving component 668 being formed of ferromagnetic material. The EP magnet will remain in the second state, generating the second magnetic field, even in absence of the first magnetic field, that is, even when current is no longer passing through the coil 652.

Figure 7:
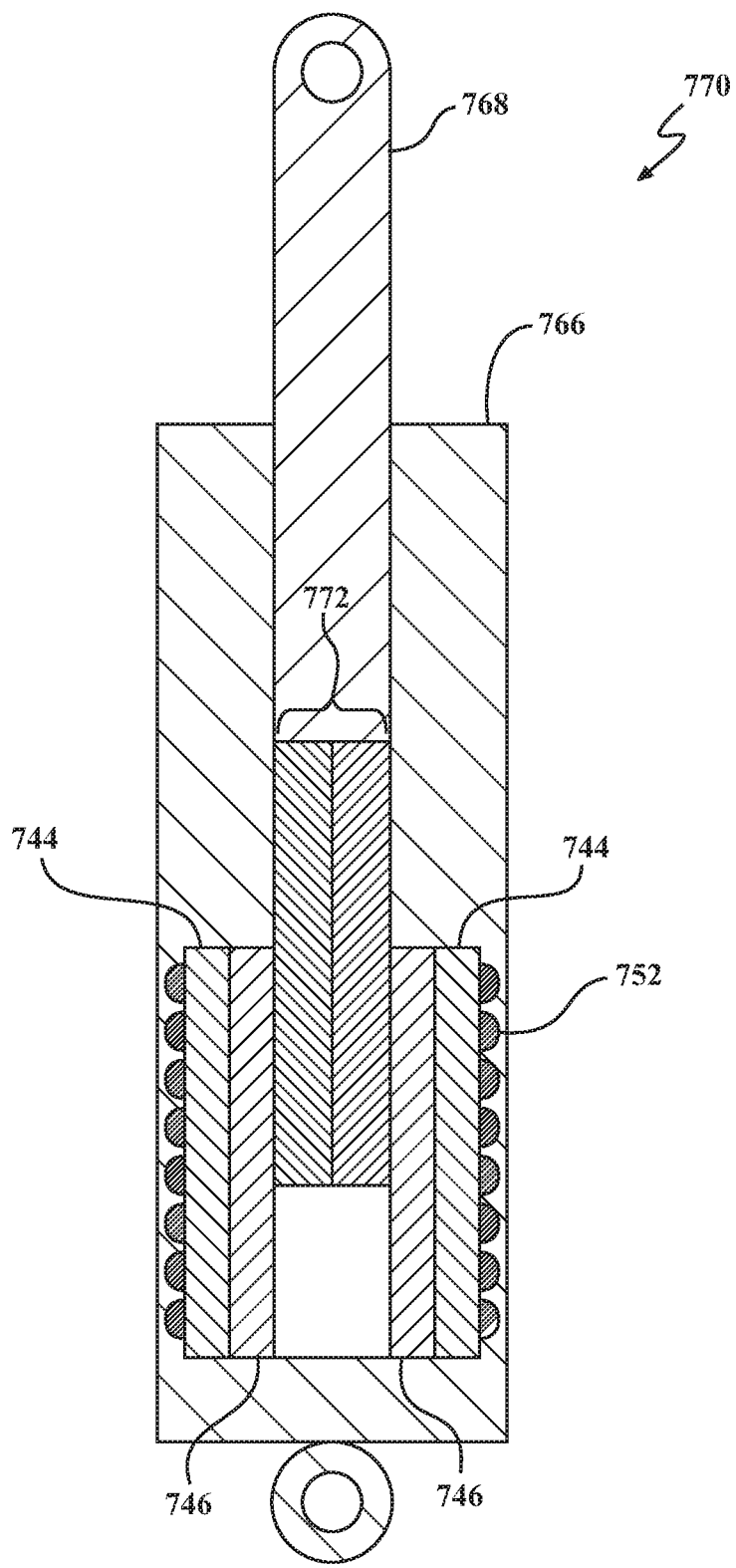
FIG. 7 is a cross-section of a spring for use in an active suspension system.

FIG. 7 is a cross-sectional view of a spring 770 for use in an active suspension system. The spring 770 includes a static component 766 and a moving component 768. The static component 766 includes an EP magnet formed of a pair of rods 744, 746 of different permanent magnet materials surrounded or wrapped by a coil 752. The rods 744, 746 and the coil 752 can be situated generally adjacent to the moving component 768. One of the rods 744 can be formed of a hard magnetic material, such as NdFeB, and the other of the rods 746 can be formed of a semi-hard magnetic material, such as Alnico V. The moving component 768 can include a permanent magnet 772, represented in FIG. 7 by two poles, though the moving component 768 could also include fluids saturated with magnetic materials.

A spring constant of the spring 770 can be modified by changing a state of the EP magnet from a first state (e.g., an "off" state) to a second state (e.g., an "on" state). This change in state of the EP magnet can be driven, for example, by the controller 220 detecting a change in a vehicle operating characteristic. For example, the sensors 116 may provide information to the controller 220 that indicates the vehicle 100 is experiencing an increase or decrease in harmonic or oscillatory input from a driving surface consistent with a change in ride characteristics of the vehicle. Using the controller 220 to send a command to the actuator system 222 to make a change in a spring constant in one or more of the suspension components 106, that is, a change that either softens or stiffens the spring 770 based on changing the spring constant, can improve ride feel for a passenger within the vehicle 100.

Upon detecting the change in the vehicle operating characteristic, the controller 220 can send a command to the actuator system 222 to pass a current through the coil 752 that will impose a first magnetic field across the rods 744, 746. The first magnetic field can have a predetermined magnetic field intensity or predetermined strength based, for example, on a magnitude of the change in the vehicle operating characteristic. The first magnetic field can be applied for a predetermined duration sufficient to transition the EP magnet from a first state (e.g., either an "on" state or an "off" state) to a second state (e.g., the other of the "on" state or the "off" state). In other words, the predetermined duration of the application of the first magnetic field can be based on the amount of energy required to transition the EP magnet from the first state to the second state. The predetermined strength of the magnetic field can dictate a magnitude of the modification of the spring constant of the spring 770. Depending on the terrain, stiffer or weaker spring constants may be desirable to provide an adequate ride feel for passenger comfort. The changes between states of the EP magnet can be implemented quickly such that an active suspension adequately responds to changes in ride surfaces.

The rods 744, 746 of the EP magnet can be such that there is no residual magnetic flux density, that is, the rods 744, 746 do not generate their own magnetic field when the EP magnet is in the first state. The rods 744, 746 of the EP magnet can have a residual flux density, that is, can generate a second magnetic field once the EP magnet transitions from the first state to the second state. The strength of the second magnetic field can be based on the strength and duration of application of the first magnetic field. Depending on a magnitude and a sign of the second magnetic field, and depending on a polarity of the permanent magnet 772 forming the moving component 768, the static component 766 of the spring 770 will either attract or repel the moving component 768. The EP magnet will remain in the second state, generating the second magnetic field, even in absence of the first magnetic field, that is, even when current is no longer passing through the coil 752.

Figure 8:
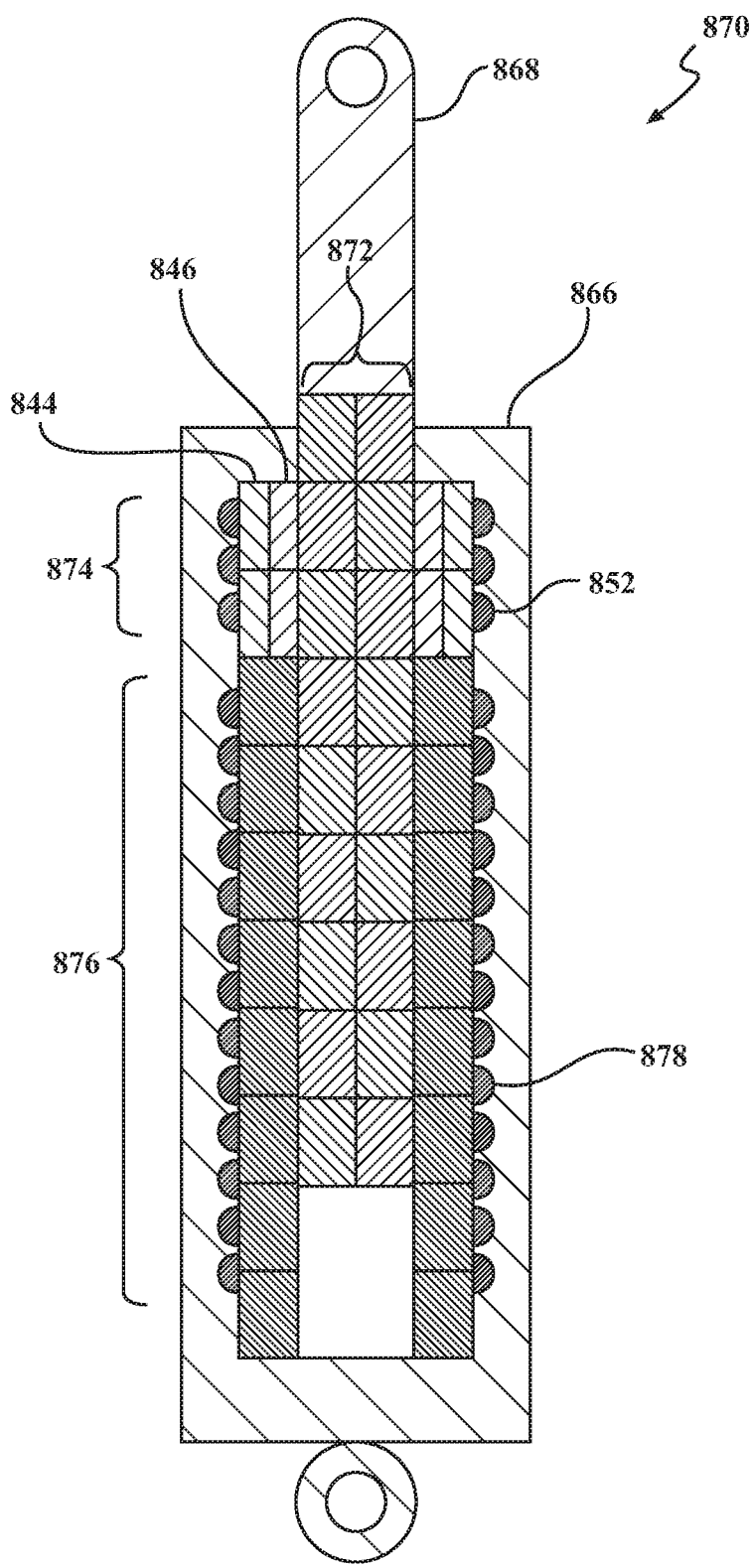
FIG. 8 is a cross-section of another spring for use in an active suspension system.

FIG. 8 is a cross-section of another spring 870 for use in an active suspension system. The spring 870 includes a static component 866 and a moving component 868. The static component 866 includes a first magnetic section 874. The first magnetic section 874 includes an EP magnet formed of a pair of rods 844, 846 of different permanent magnet materials surrounded or wrapped by a coil 852. The rods 844, 846 and the coil 852 can be situated generally adjacent to the moving component 868. One of the rods 844 can be formed of a hard magnetic material, such as NdFeB, and the other of the rods 846 can be formed of a semi-hard magnetic material, such as Alnico V. The static component 866 also includes a second magnetic section 876. The second magnetic section 876 includes another coil 878, the coil 878 being separate from the coil 852.

The moving component 868 includes a permanent magnet 872. In FIG. 8, the permanent magnet 872 is shown as having sections of alternating polarity. In particular, the sections of the permanent magnet 872 alternate in polarity along an axial length of the moving component, allowing for finer control of positioning of the moving component 868 in respect to the static component 866. In other examples (not shown), the moving component 868 could include fluids saturated with magnetic materials.

During electromagnetic operation of the spring 870, a current can be passed through the coil 878 of the second magnetic section 876. In this electromagnetic operation example, the permanent magnet 872 in the moving component 868 is attracted or repelled based on the sign (i.e., polarity) and strength of a magnetic field generated by the coil 878 and acting on the permanent magnet 872. Electromagnetic operation has a direct effect on a spring constant of the spring 870, though it requires a continuous power draw to maintain the effect.

The EP magnet in the first magnetic section 874 can be used to lock a position of the moving component 868 to save energy expended in electromagnetic operation of the spring 870 in certain situations. As used herein, locking a position of the moving component 868 using the first magnetic section 874 means that magnetic interaction biases the moving component 868 toward a specific positional relationship relative to the static component 866, and may restrain the moving component 868 against moving away from the specific positional relationship. For example, if the vehicle 100 has stopped, locking a position of the moving component 868 using the first magnetic section 874 will allow the coil 878 to be de-energized while at the same time retaining damping characteristics of the spring 870. Use of the EP magnet can be triggered by the controller 220 detecting a change in a vehicle operating characteristic. In this example, the change can be a reduction in wheel speeds to a level that indicates a lack of an external harmonic or oscillatory input to the vehicle 100, that is, that the vehicle 100 has stopped.

Upon detecting the change in the vehicle operating characteristic, the controller 220 can send a command to the actuator system 222 to pass a current through the coil 852 that will impose a first magnetic field across the rods 844, 846 sufficient to transition the EP magnet from an "off" state to an "on" state as previously described. The EP magnet will remain in the "on" state, generating a second magnetic field, even in absence of the first magnetic field, that is, even when current is no longer passing through the coil 852. The second magnetic field can be sufficient to change a spring constant of the spring 870 such that a position of the moving component 868 is fixed in respect to the static component 866.

One the moving component 868 is fixed in position, the controller 220 can send another command to the actuator system 222 to de-energize the coil 878, changing the magnitude of a third magnetic field, that is, a magnetic field generated in the second magnetic section 876. De-energizing the coil 878 can save power since the second magnetic section 876 is not required to electromagnetically modify a spring constant of the spring 870 once the first magnetic section 874 operates as an EP magnet in the "on" state. Though the example above is explained in the context of using the first magnetic section 874 as a position lock and the second magnetic section 876 for general electromagnetic operation of the spring 870, the roles may differ, switch, or be combined using other algorithms that improve performance of the spring 870 both for passenger comfort and for energy consumption. In addition, because the alternating polarity of the sections of the permanent magnet 872, the first magnetic section 874 can lock the moving component 868 at various extension lengths relative to the static component 870 to, for example, define various ride heights for the vehicle 100.

Both of the springs 770, 870 described in respect to FIGS. 7 and 8 also allow control of mechanical resistance and the regeneration of energy. For example, regeneration is possible because the permanent magnets 772, 872 in these examples are part of the moving components 768, 868 and the moving components 768, 868 are wrapped in the coils 752, 852, 878 disposed in the static components 766, 866. In other words, the coils 752, 852, 878 can be used to return energy to a central power supply of the vehicle 100 even in the absence of current flow.

Figure 9:
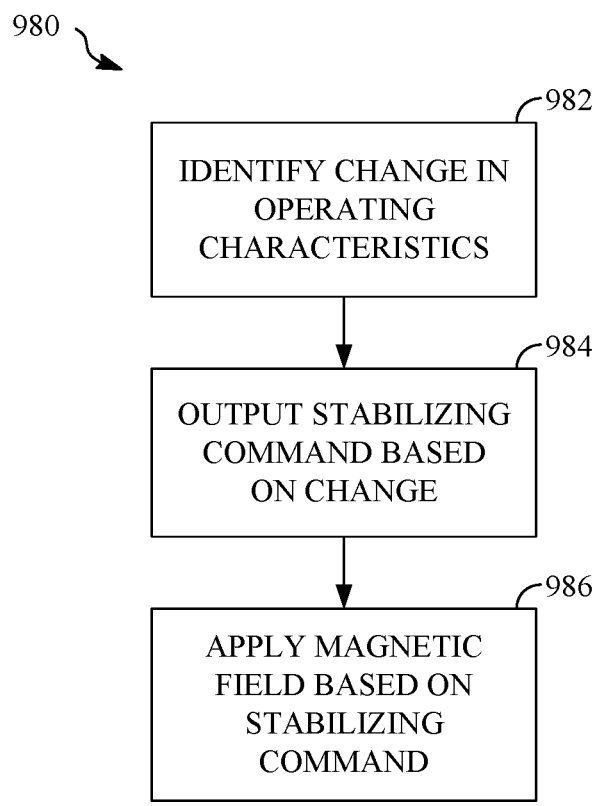
FIG. 9 is a flowchart describing a method of vehicle stabilization using an active suspension system.

FIG. 9 is a flowchart describing a method 980 of vehicle stabilization using an active suspension system, such as the suspension system 224 of FIG. 2. The method 980 includes identifying 982 a change in a vehicle operating characteristic. For example, the controller 220 can receive information from one or more sensors 116 indicative of an increase or a decrease in harmonic or oscillatory input from a driving surface consistent with a change in ride characteristics of the vehicle 100.

The method 980 also includes outputting 984 a stabilizing command to the actuator system 222 based on identifying the change in the vehicle operating characteristic. The stabilizing command can be sent, for example, from the controller 220 to the actuator system 222. The stabilizing command can include instructions to modify performance, for example, of one or more of the suspension components 106 in the suspension system 224.

The method 980 also includes applying 986 a magnetic field having a predetermined strength to an EP magnet, such as the EP magnets described in FIGS. 6, 7, and 8, for a predetermined duration based on receiving the stabilizing command. The actuator system 222 can apply the magnetic field directly or interface with, for example, the suspension system 224 to apply the magnetic field.

As described in previous examples with respect to FIGS. 6, 7, and 8, the magnetic field can be a first magnetic field that transitions the EP magnet from a first state, such as an "off" state, to a second state, such as an "on" state. The EP magnet can generate a second magnetic field in the second state. The second magnetic field can modify at least one of a spring constant or a mechanical resistance of one of the suspension components 106 within the suspension system 224 of the vehicle 100, changing a ride feel of the vehicle 100. The EP magnet can also retain the second state after the predetermined duration in absence of the first magnetic field, saving energy in operating the suspension system 224.

Figure 10:
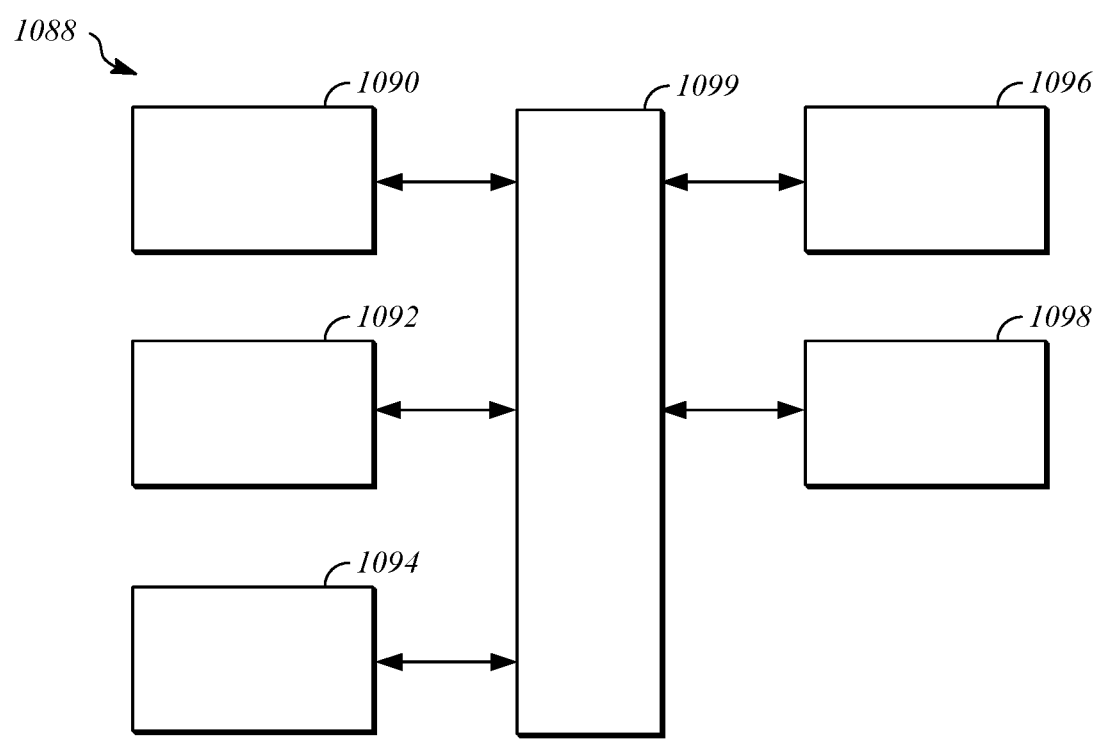
FIG. 10 is a hardware configuration for a controller device.

FIG. 10 shows an example of a hardware configuration for a controller 1088 that may be used to implement the apparatuses, systems, and methods described herein. As an example, the controller 1088 may be used to implement the control system 218 and/or individual components of the control system 218. The controller 1088 may include a processor 1090, a memory 1092, a storage device 1094, one or more input devices 1096, and one or more output devices 1098. The controller 1088 may include a bus 1099 or a similar device to interconnect the components for communication.

The processor 1090 is operable to execute computer program instructions and perform operations described by the computer program instructions. As an example, the processor 1090 may be a conventional device such as a central processing unit. The memory 1092 may be a volatile, high speed, short-term information storage device such as a random-access memory module. The storage device 1094 may be a non-volatile information storage device such as a hard drive or a solid-state drive. The input devices 1096 may include any type of human-machine interface such as buttons, switches, a keyboard, a mouse, a touchscreen input device, a gestural input device, or an audio input device. The output devices 1098 may include any type of device operable to provide an indication to a user regarding an operating state, such as a display screen or an audio output.

What is claimed is:

1. A method of stabilizing a vehicle, comprising:
   identifying, by a control system, a change in ride characteristics of the vehicle; and
   sending, from the control system, a stabilizing command to an actuator system based on the change in ride characteristics of the vehicle, the actuator system configured to apply a first magnetic field to an electropermanent magnet based on receiving the stabilizing command,
   wherein the first magnetic field has a strength based on a magnitude of the change in ride characteristics of the vehicle, has a predetermined duration, and transitions the electropermanent magnet from a first state to a second state,
   wherein the electropermanent magnet generates a second magnetic field in the second state that modifies a mechanical resistance of a suspension component within a suspension system of the vehicle,
   wherein a strength of the second magnetic field is based on the strength and the predetermined duration of the first magnetic field, and
   wherein the electropermanent magnet retains the second state after the predetermined duration in absence of the first magnetic field.

2. The method of claim 1, wherein the electropermanent magnet does not generate a magnetic field in the first state.

3. The method of claim 1, wherein the change in ride characteristics is an increase or a decrease in an external harmonic or oscillatory input to the vehicle.

4. The method of claim 1, wherein the change in ride characteristics is a reduction in wheel speeds to a level that indicates a lack of an external harmonic or oscillatory input to the vehicle.

5. The method of claim 1, wherein the second magnetic field modifies a spring constant to lock a movable portion of the suspension component.

6. The method of claim 5, further comprising:
   based on the second magnetic field modifying the spring constant, sending, from the control system, a command to the actuator system to change a magnitude of a third magnetic field acting upon an electromagnet within the suspension component.

7. The method of claim 1, wherein the predetermined duration of the first magnetic field is based on an amount of energy required to transition the electropermanent magnet from the first state to the second state.

8. A suspension component for an active suspension system, comprising:
   a first component that includes an electropermanent magnet having a coil, differing first and second permanent magnet materials, and differing first and second states, wherein the first permanent magnet material has a larger magnetic coercivity than the second permanent magnet material;
   a second component configured to magnetically interact with the first component to define a damping characteristic that affects motion between the first component and the second component; and
   a controller configured to supply a current pulse to the electropermanent magnet to switch the electropermanent magnet between the first and second states,
   wherein the electropermanent magnet retains the respective first or second state after cessation of the current pulse.

9. The suspension component of claim 8, wherein the second component includes a permanent magnet.

10. The suspension component of claim 8, wherein the current pulse changes a magnetic polarity of the second permanent magnet material to switch the electropermanent magnet between the first and second states.

11. The suspension component of claim 8, wherein the current pulse is applied to the coil of the electropermanent magnet.

12. The suspension component of claim 11, wherein application of the current pulse to the coil generates a magnetic field that causes the electropermanent magnet to switch between the first and second states.

13. The suspension component of claim 8, wherein the electropermanent magnet does not generate a magnetic field in the first state and the electropermanent magnet generates a magnetic field in the second state.

14. The suspension component of claim 8, wherein the controller supplies the current pulse in response to detection of a change in ride characteristics of a vehicle.

15. The suspension component of claim 14, wherein the change in the ride characteristics includes at least one of an increase in an external harmonic or oscillatory input to the vehicle, a decrease in the external harmonic or oscillatory input to the vehicle, or a reduction in wheel speeds to a level that indicates a lack of the external harmonic or oscillatory input to the vehicle.

16. A suspension component, comprising:
   a first component that includes a first magnetic section that includes an electropermanent magnet having a coil and a second magnetic section that includes an electromagnet;
   a second component that includes a permanent magnet having sections that alternate in polarity along an axial length of the second component, wherein magnetic interaction of the permanent magnet with the first magnetic section and the second magnetic section affects motion between the first component and the second component; and a controller configured to supply a current pulse to the coil of the electropermanent magnet to generate a magnetic field that causes the electropermanent magnet to switch between a first state and a second state, wherein the electropermanent magnet retains the respective first or second state after cessation of the current pulse, and wherein the second component is locked relative to the first component when the electropermanent magnet is in the first state.

17. The suspension component of claim 16, wherein the second component is not locked relative to the first component when the electropermanent magnet is in the second state.

18. The suspension component of claim 16, wherein:

the electropermanent magnet includes a first permanent magnet material and a second permanent magnet material that is different from the first permanent magnet material, and the first permanent magnet material has a larger magnetic coercivity than the second permanent magnet material.

19. The suspension component of claim 18, wherein the magnetic field causes the electropermanent magnet to switch between the first state and the second state by changing a magnetic polarity of the second permanent magnet material.

20. The suspension component of claim 8, wherein a duration of the current pulse supplied to the electropermanent magnet is based on an amount of energy required to transition the electropermanent magnet from the first state to the second state.

* * * * *